(12) United States Patent
Gamon

(10) Patent No.: US 6,345,318 B1
(45) Date of Patent: Feb. 5, 2002

(54) SYSTEM FOR MAINTAINING A USER-MODIFIABLE CONFIRMATION MESSAGE CONFIGURATION RECORD THAT SPECIFYING WITH RESPECT TO A PLURALITY OF OPERATIONS WHETHER TO COMMUNICATE A CONFIRMATION MESSAGE

(75) Inventor: Owen John Gamon, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/167,788

(22) Filed: Oct. 7, 1998

(51) Int. Cl.[7] .............................................. G06F 13/14
(52) U.S. Cl. ............................. 710/8; 345/347; 345/356
(58) Field of Search ............................... 710/8; 345/356, 345/347

(56) References Cited

U.S. PATENT DOCUMENTS

| | | | |
|---|---|---|---|
| 5,377,354 A | * 12/1994 | Scannell et al. | 709/103 |
| 5,394,540 A | * 2/1995 | Barrington et al. | 395/500 |
| 5,428,734 A | * 6/1995 | Haynes et al. | 395/349 |
| 5,566,339 A | 10/1996 | Perholtz et al. | 395/750 |
| 5,671,440 A | * 9/1997 | Curry | 395/828 |
| 5,675,805 A | 10/1997 | Boldo et al. | 395/706 |
| 5,796,948 A | * 8/1998 | Cohen | 709/206 |
| 5,835,090 A | * 11/1998 | Clark et al. | 345/339 |
| 5,864,684 A | * 1/1999 | Nielsen | 709/206 |
| 5,909,215 A | * 6/1999 | Berstis et al. | 345/340 |
| 6,118,451 A | * 9/2000 | Alexander | 345/356 |

FOREIGN PATENT DOCUMENTS

| | | | |
|---|---|---|---|
| GB | 2278468 | 11/1994 | G06F/9/445 |
| JP | 9106377 | 4/1997 | G06F/12/16 |
| JP | 9204333 | 8/1997 | G06F/12/00 |

OTHER PUBLICATIONS http://www.bobos.demon.co.uk/par/PTFB.htm, "Push the Freakin' Button", Nov. 1998.
wysiwyg://26/http://cgi.zdnet.com/cgi-bin/printme.fcgi, "Pesky dialog boxes giving you trouble?", Apr. 25, 1998.
IBM Technical Disclosure Bulletin, vol. 38, No. 7, Jul. 1995, pp. 357–358, entitled "Design of the Commit Install Plan Process for a Network Installation Program".
Download Confirminator 1.0 for Win95, NONAGS Misc. Utilities—32 bit, http://cnyweb.com/nonags/miscu.html, p. 15 of 23.

* cited by examiner

Primary Examiner—Thomas Lee
Assistant Examiner—Abdelmoniem Elamin
(74) Attorney, Agent, or Firm—Roy W. Truelson; Owen J. Gamon

(57) ABSTRACT

A method and system for presenting only those confirmation messages that the user would like to see. In the preferred embodiment, a control program allows the user to specify categories of operations in a category list, to select which categories receive confirmation messages, and to select which categories of operations have deleted data sent to a recycle bin. In the preferred embodiment, a control program intercepts all confirmation messages and determines whether the operation that caused the confirmation message is in a category list. If the operation is in the category list, the control program automatically responds to the message based on the response listed in the category list, so that the user is free from needing to deal with the message. The control program also determines whether to send deleted data to the recycle bin based on an indicator in the category list. Provision is made for the control program to either be an application that intercepts messages that the operating system sends, or for the control program to be part of the operating system.

37 Claims, 15 Drawing Sheets

SYSTEM FOR MAINTAINING A USER-MODIFIABLE CONFIRMATION MESSAGE CONFIGURATION RECORD THAT SPECIFYING WITH RESPECT TO A PLURALITY OF OPERATIONS WHETHER TO COMMUNICATE A CONFIRMATION MESSAGE

FIELD OF THE INVENTION

The present invention relates in general to improved information processing systems. In particular, the present invention relates to a method and system for configurable categories of confirmation messages.

BACKGROUND

Even the earliest computer systems included rudimentary mechanisms that allowed them to receive input from their users. These mechanisms are called user interfaces. The user interfaces of early computers often employed lights and switches that allowed the user to communicate with the computer system in the system's native language. This form of communication was essentially limited to scientists and engineers who were trained to understand the particulars of the computer system. For this reason, computer-system providers moved to user interfaces that allowed entry of textual commands. While these command-based user interfaces were easier to use than their predecessors, they still involved a large number of commands that were often difficult for non-technical users to understand and remember. The shortcomings of command-based user interfaces lead to the introduction of graphical user-interfaces, which are often referred to as GUIs. Instead of requiring the user to have in-depth knowledge of the computer system, GUIs allow even the novice user to communicate with the computer system via a pointing device, such as a mouse. To use the computer system to perform various tasks, the user simply "points and clicks" on various displayed GUI items such as icons and taskbars, which are user-friendly, easy ways of activating programs on and requesting operations of the computer.

As user interfaces became easier to use, it also became easier for the user to inadvertently destroy important data. For example, in the early days of the DOS operating system, the user could destroy all data on the hard drive by merely typing "format c:" when merely mistyping one letter, the user could mistakenly destroy all data on the computer system. GUIs also made it easy for the user to inadvertently destroy data. A GUI often provides the user with menus of potential operations. The user selects an operation from the menu by pointing the mouse pointer at the operation and clicking a mouse button. Thus, if the "delete" operation and the "rename" operation are adjacent on the menu, it is easy for the user to inadvertently select "delete" by pointing the mouse pointer at slightly the wrong location.

Prior operating systems employ an extreme approach to address this inadvertent, data-destruction problem: they send a confirmation message to the user for every requested, destructive operation. Examples of destructive operations are deleting files in folders, emptying the recycle bin, formatting the hard drive, reinstalling the operating system, copying or moving a file into a folder containing a preexisting file with the same name, and dropping the phone connection upon exiting a browser. As a further safeguard, when the user responds affirmatively to the confirmation message, instead of deleting the data, the operating system merely moves the data to a special folder or location, which is often called a recycle bin, trash can, or trash-basket folder. In order to delete the data from the recycle bin, the user must request another operation, which causes the operating system to issue yet another confirmation message. Thus, to delete a single file, the user must issue a delete operation, respond positively to the confirmation message, open the recycle bin, empty the recycle bin, and finally respond positively to yet another confirmation message.

But, the vast majority of time that the user requests a destructive operation, the user intends the operation requested. Although it is infrequent that the user has typed in the wrong name or selected the wrong command from a menu, the confirmation message occurs on every destructive operation. Because of this constant bombardment of confirmation messages asking: "are you sure you want to delete?", users become so accustomed to the messages that they habitually respond "yes" without thinking because they are in a hurry and because "yes" is the intended response the vast majority of the time. Thus, in the rare occasions when the user intends to respond "no" because the user mistakenly requested a delete operation, the user will likely mistakenly respond "yes" to the confirmation message, regardless.

Thus, while all these confirmation messages are well intentioned, they both fail to achieve their intended purpose and only serve to annoy the user. Further, little purpose is served by a confirmation message for destroying data when the only negative consequence is the user requesting restoration from the recycle bin. Thus, there is a need for a mechanism that gives the user control of which operation receives a confirmation message and of which deleted data is sent to the recycle bin.

SUMMARY OF THE INVENTION

The invention is a method and system for presenting only those confirmation messages that the user would like to see. In the preferred embodiment, a control program allows the user to specify categories of operations in a category list, to select which categories receive confirmation messages, and to select which categories of operations have deleted data sent to a recycle bin. In the preferred embodiment, a control program intercepts all confirmation messages and determines whether the operation that caused the confirmation message is in a category list. If the operation is in the category list, the control program automatically responds to the message based on the response listed in the category list, so that the user is free from needing to deal with the message. The control program also determines whether to send deleted data to the recycle bin based on an indicator in the category list. Provision is made for the control program to either be an application that intercepts messages that the operating system sends, or for the control program to be part of the operating system.

DESCRIPTION OF THE PREFERRED EMBODIMENT

Figure 1:
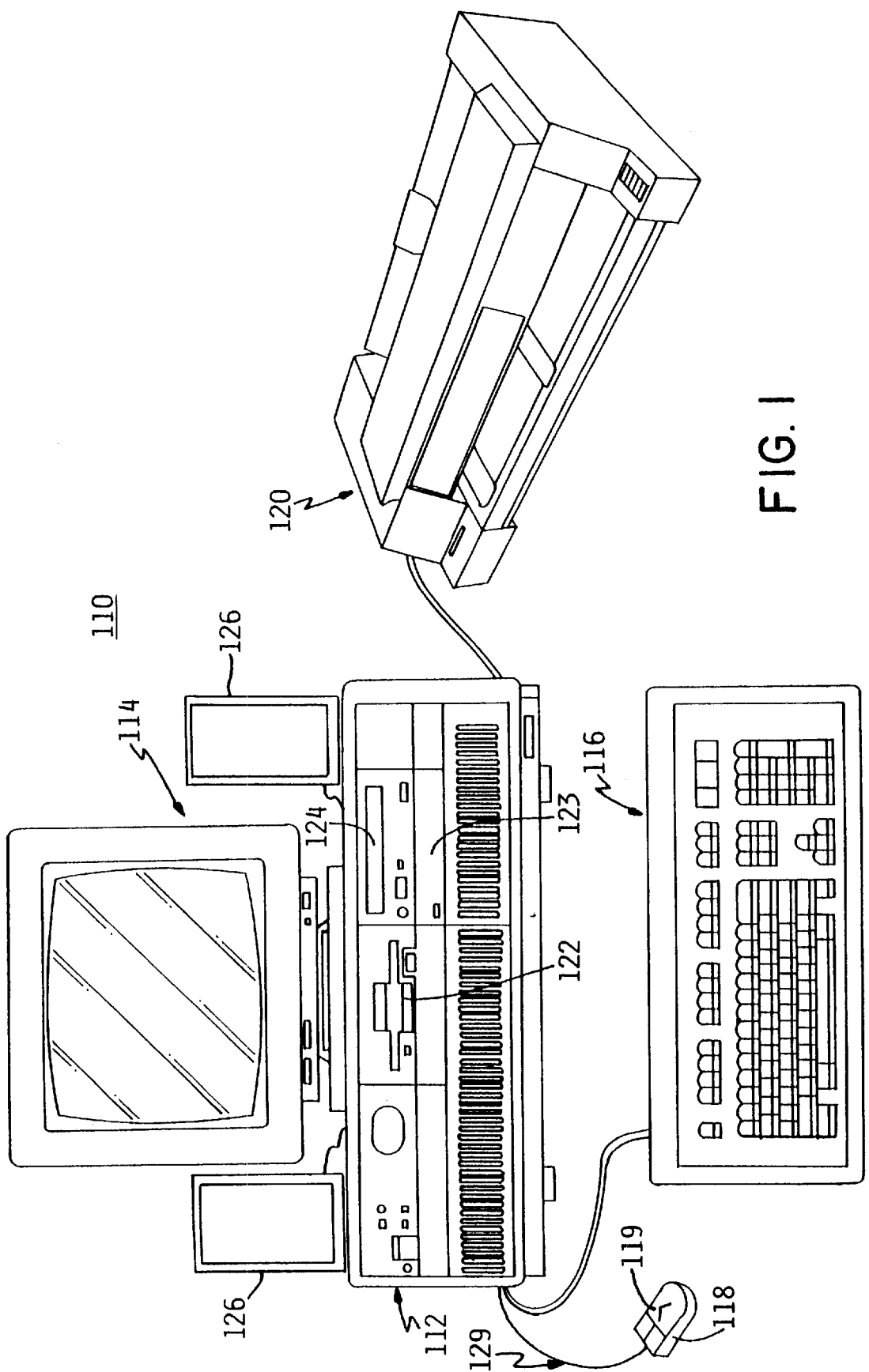
FIG. 1 is a pictorial representation of a computer system that may be utilized to implement a preferred embodiment.

With reference now to the figures and in particular with reference to FIG. 1, there is depicted an embodiment of a computer system that may be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, track ball, or track pad could also be utilized.

Keyboard 116 is that pail of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a QWERTY pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 114.

Video-display terminal 114 is the visual output of computer system 110. As indicated herein, video-display terminal 114 can be a cathode-ray tube (CRT) based video display well-known in the art of computer hardware. But, with a portable or notebook-based computer, video display terminal 114 can be replaced with a liquid crystal display (LCD) based or gas, plasma-based, flat-panel display.

Pointing device 118 features a casing with a flat bottom that can be gripped by a human hand. Pointing device 118 can include buttons on the top, a multidirectional detection device such as a ball on the bottom, and a cable 129 that connects pointing device 118 to processing unit 112. Pointing device 118 contains scroll wheel 119, which is a wheel that can be rotated by the user. When interpreted by the operating system, the user can utilize scroll wheel 119 to perform a variety of functions, most typically controlling the scroll bar of the active window.

To support storage and retrieval of data, processing unit 112 further includes diskette drive 122, hard-disk drive 123, and CD-ROM drive 124, which are interconnected with other components of processing unit 112.

Computer system 110 can be implemented utilizing any suitable computer such as the IBM Aptiva computer, a product of International Business Machines Corporation, located in Armonk, N.Y. But, a preferred embodiment of the present invention can apply to any hardware configuration that allows confirmation messages, regardless of whether the computer system is a complicated, multi-user computing apparatus, a single-user workstation, or a network appliance that does not have non-volatile storage of its own.

Figure 2:
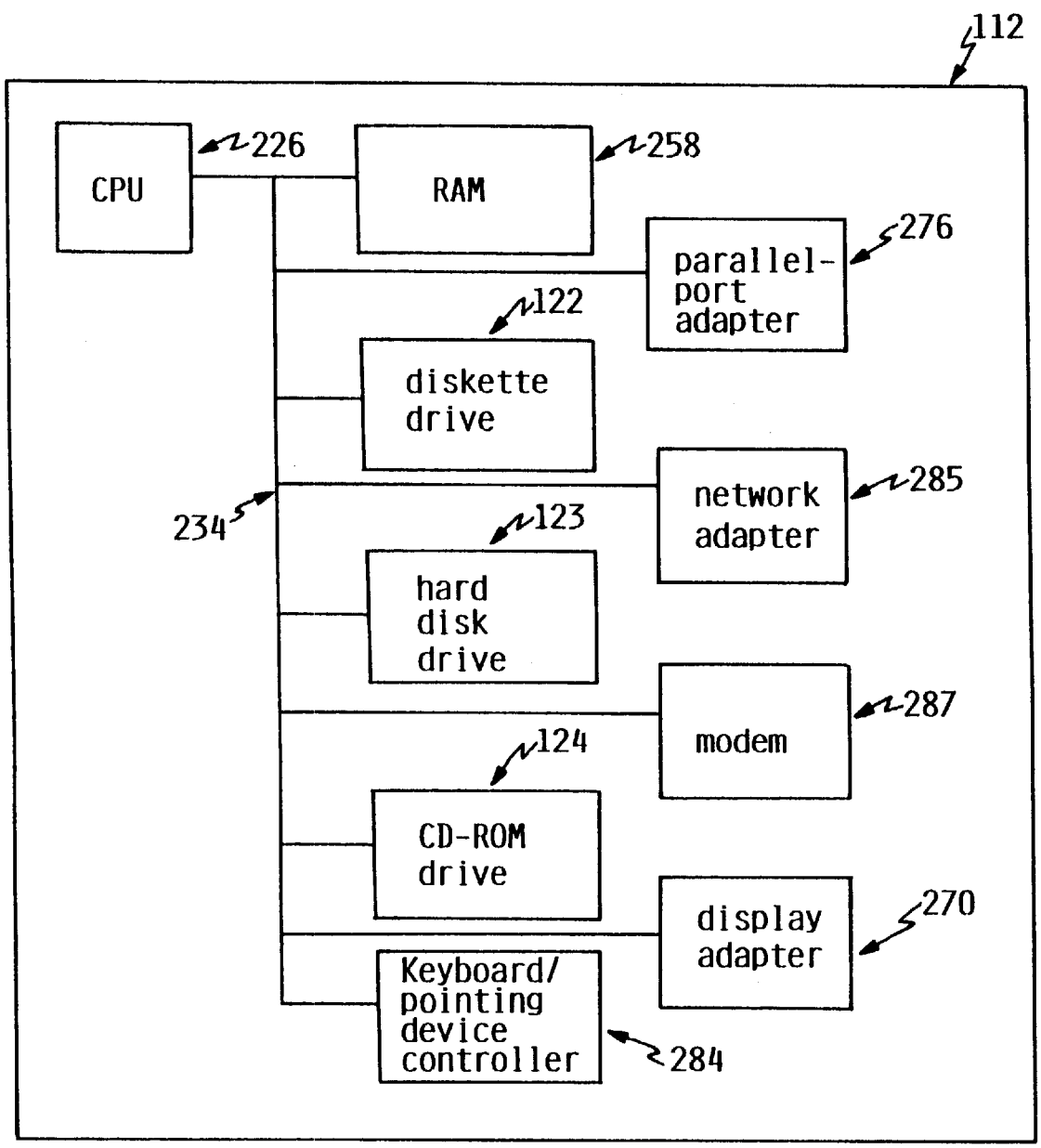
FIG. 2 is a block diagram of a representative hardware environment of the processing unit of the computer system illustrated in FIG. 1.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

CPU 226 includes the portion of computer system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented as one of the 80×86 or Pentium processors, or any other type of processor, which are available from a number of vendors. Although computer system 110 is shown to contain only a single CPU and a single system bus, the present invention applies equally to computer systems that have multiple CPUs and to computer systems that have multiple buses that each perform different functions in different ways.

RAM 258 comprises a number of individual, volatile-memory modules that store segments of operating system and application software while power is supplied to computer system 110. The software segments are partitioned into one or more virtual-memory pages that each contain a uniform number of virtual-memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without starting from the beginning.

Hard disk drive 123 and diskette drive 122 are electro-mechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or micro-floppy disk (e.g., 3.5 inch) is encased in a protective, plastic jacket. But, any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers.

Display adapter 270 translates graphics data from CPU 226 into video signals utilized to drive display device 114. Application and operating system software use display adapter 270 to display the graphical user interface on display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated, local-area network (LAN). A LAN provides a user of computer system 110 with a means of electronically communicating information, including software, with a remote computer or a network logical-storage device. In addition, a LAN supports distributed processing, which enables computer system 10 to share a task with other computer systems linked to the LAN.

Modem 287 supports communication between computer system 110 and another computer system over a standard telephone-line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable computers, mainframe computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable, storage media (e.g., read-only memory devices within a computer such as CD-ROM disks readable by CD-ROM drive 124); (b) alterable information stored on writable, storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
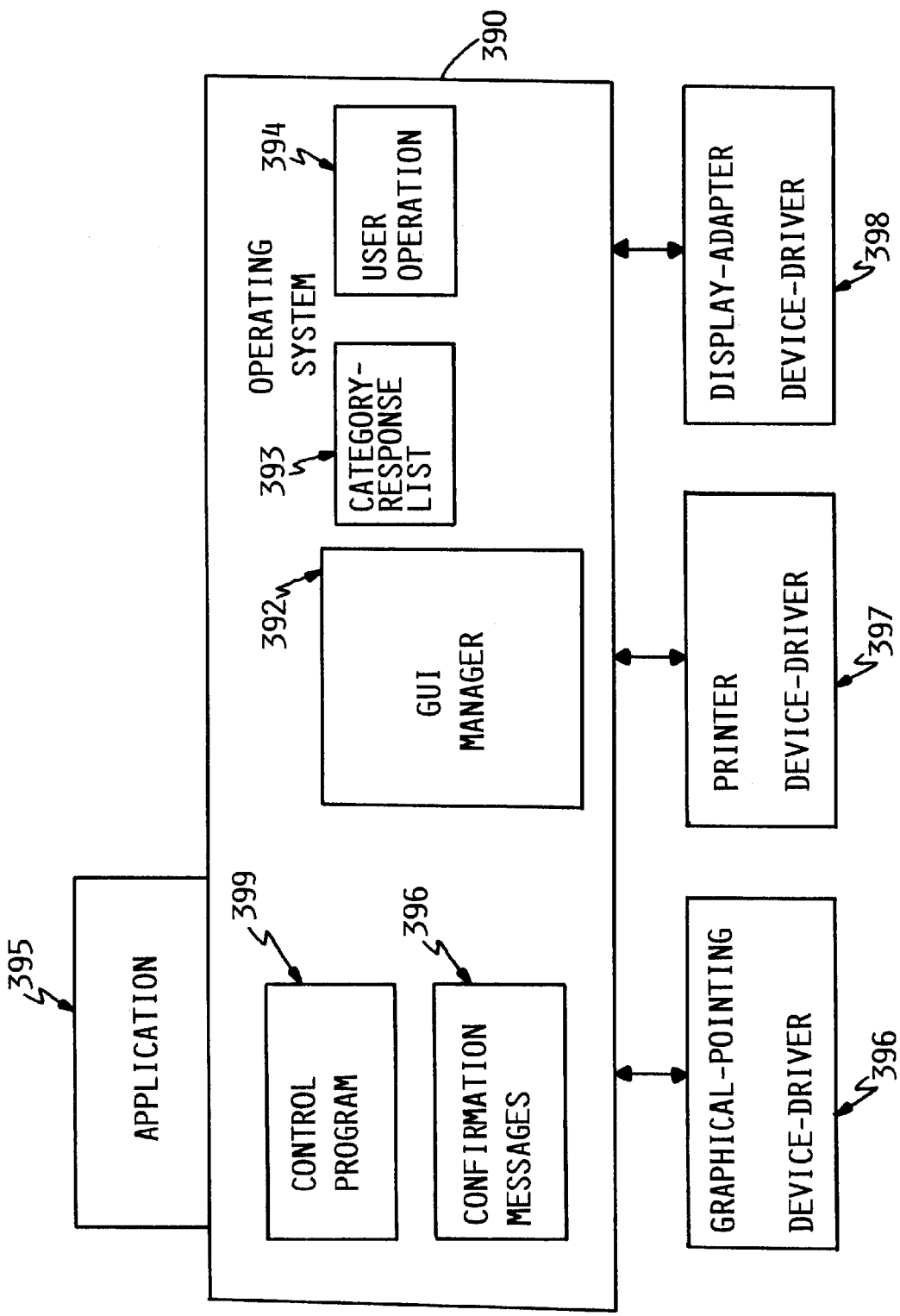
FIG. 3 is a block diagram of software stored within the memory of the computer system depicted in FIG. 1.

With reference now to FIG. 3, there is illustrated a block-diagram representation of the software configuration of computer system 110. The software configuration of computer system 110 includes application 395, operating system 390, graphical-pointing device-driver 396, printer device-driver 397, and display-adapter device-driver 398. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

Operating system 390 is responsible for directing the operation of computer system 110. For example, operating systems typically include computer software for controlling the allocation and usage of hardware resources such as memory, CPU time, disk space, and peripheral devices. Other technologies also could be utilized, such as touch-screen technology or human-voice control. The operating system is the foundation upon which applications 395, such word-processing, spreadsheet, and web-browser programs are built. In accordance with the preferred embodiment, operating system 390 includes graphical-user-interface (GUI) manager 392, control program 399, confirmation messages 396, category-response list 393, and user operation 394.

GUI manager 392 manages the graphical-user-interface with which a user of computer system 110 interacts. Operating system 390 and GUI manager 392 are drawn as being packaged together, but they could be packaged separately.

Control program 399 suitably programs CPU 226 to carry out the preferred and alternative embodiments, as described in more detail in the flowcharts of FIGS. 7, 8, 10, and 11. In the alternative, the functions of FIGS. 7, 8, 10, and 11 could be implemented by control circuitry through the use of logic gates, programmable-logic devices, or other hardware components in lieu of a processor-based system. Although control program 399 is shown as being part of operating system 390, they could be packaged separately. Thus, control program 399 could be packaged as pair of application 395, so that control program 399 would interface to operating system 390 through the application-program interface.

Confirmation messages 396 is a list of the confirmation messages that operating system 390 sends in response to destructive operations requested by the user. Confirmation messages 396 is further described below under the description for FIG. 6. Although confirmation messages 396 is shown as being part of operating system 390, they could be packaged separately. For example, confirmation messages 396 could be packaged as part of application 395.

Category-response list 393 is a list of user-requested operations and the responses to the confirmation messages and the recycle bin actions that the user would like control program 399 to take. Category-response list 393 is further described below under the description for FIG. 5. Although category-response list 393 is shown as being part of operating system 390, they could be packaged separately. For example, category-response list 393 could be packaged as part of application 395.

User operation 394 is a memory location where the user-requested operation is stored. User operation 394 is further described below in the flowchart of FIG. 7.

Operating system 390 communicates with application 395 through messages conforming to the syntax of the application-program-interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends printer-control codes and data to printer device-driver 397, which in turn translates the control codes and data into bus signals used to control printer 120.

Figure 4:
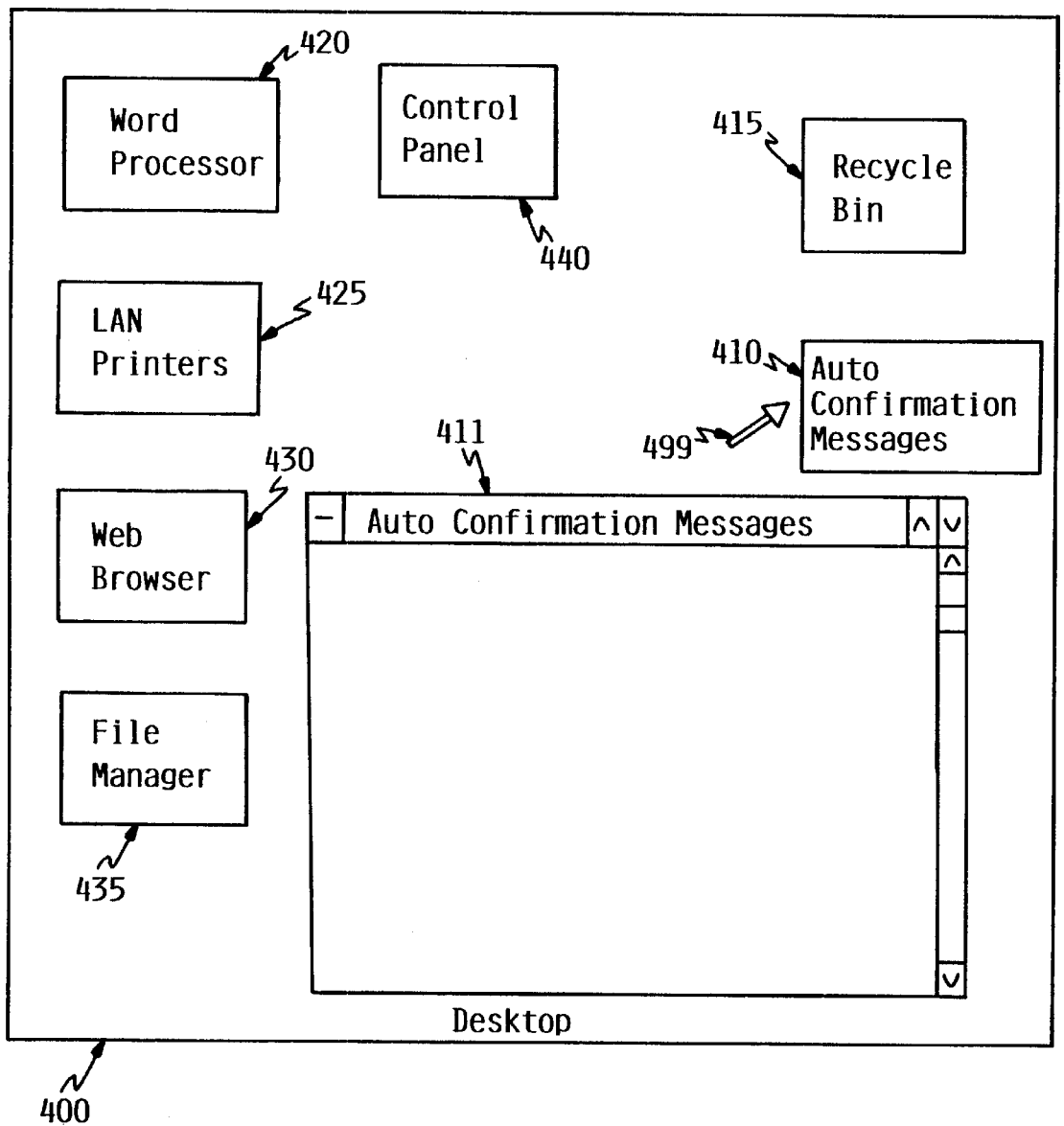
FIGS. 4 and 5 are pictorial representations of the interfaces that a user may operate to control the operation of a preferred embodiment.

FIG. 4 illustrates a pictorial representation of the interfaces that are used to control the operations of the preferred embodiment. FIG. 4 contains desktop 400, which is displayed by operating system 390 on display screen 114. Desktop 400 is the main, graphical user-interface through which the user interacts with operating system 390 and applications 395. In this example, desktop 400 contains the following icons: word processor 420, LAN printers 425, web browser 430, file manager 435, control panel 440, recycle bin 415, and auto-confirmation messages 410. Icons are symbols that represent applications, such as application 395, or functions within operating system 390. By selecting an icon with pointing-device pointer 499 using pointing device 118, the user can access or execute the application or function. In this example, the user has selected auto-configuration messages icon 410, which caused control program 399 to display window 411 on desktop 400. Window 411 is further described below under the description for FIG. 5. Recycle bin 415 is an icon that the user can use to access the recycle bin, which is a folder, or memory location, into which deleted objects are stored. If the user later decides that the deleted object is needed, the user can direct operating system 390 to restore the object from the recycle bin. The user can also empty the recycle bin, which directs operating system 390 to permanently delete objects in the recycle bin, so that they cannot be restored.

Figure 5A:
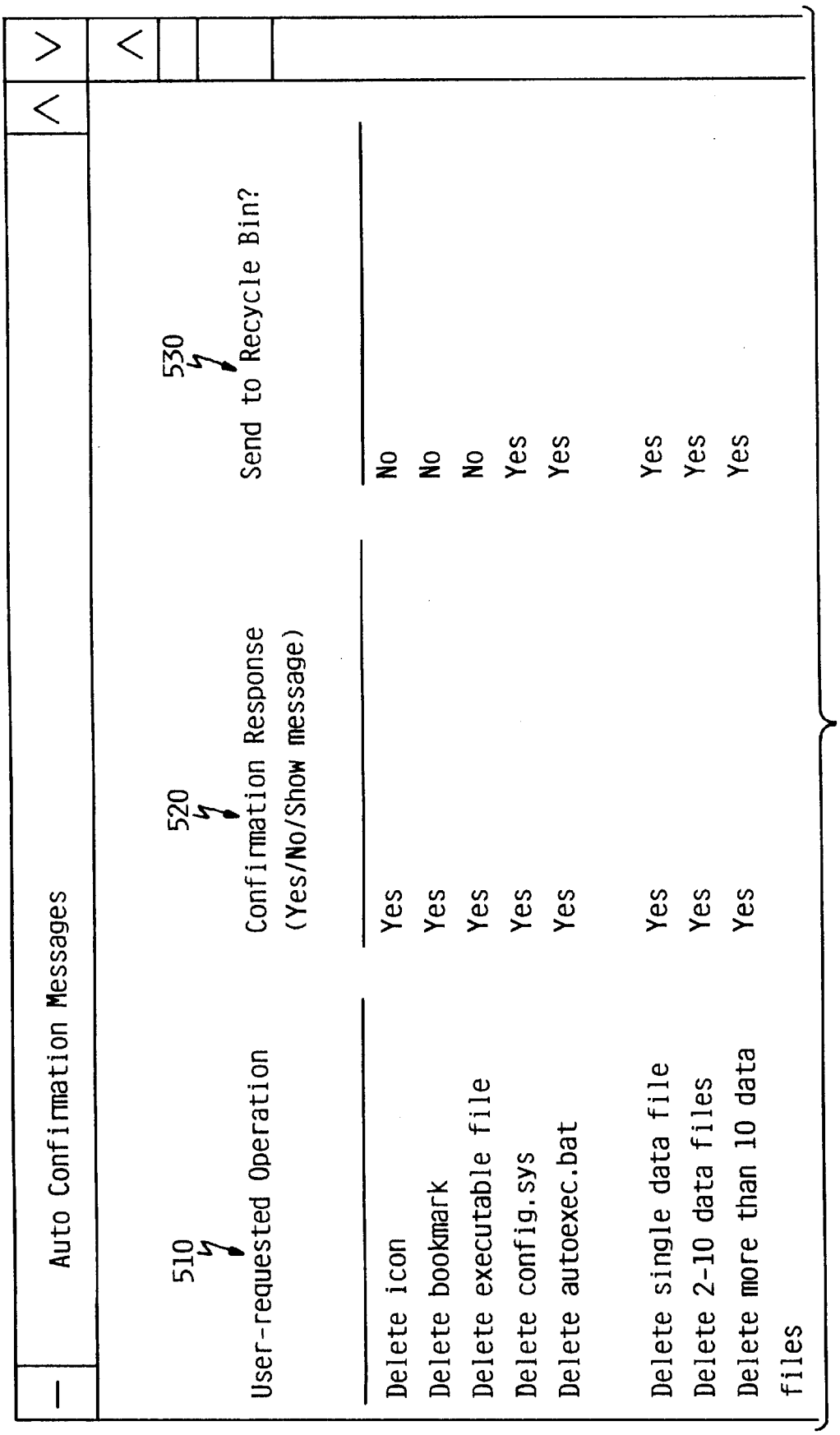
Figure 5B:
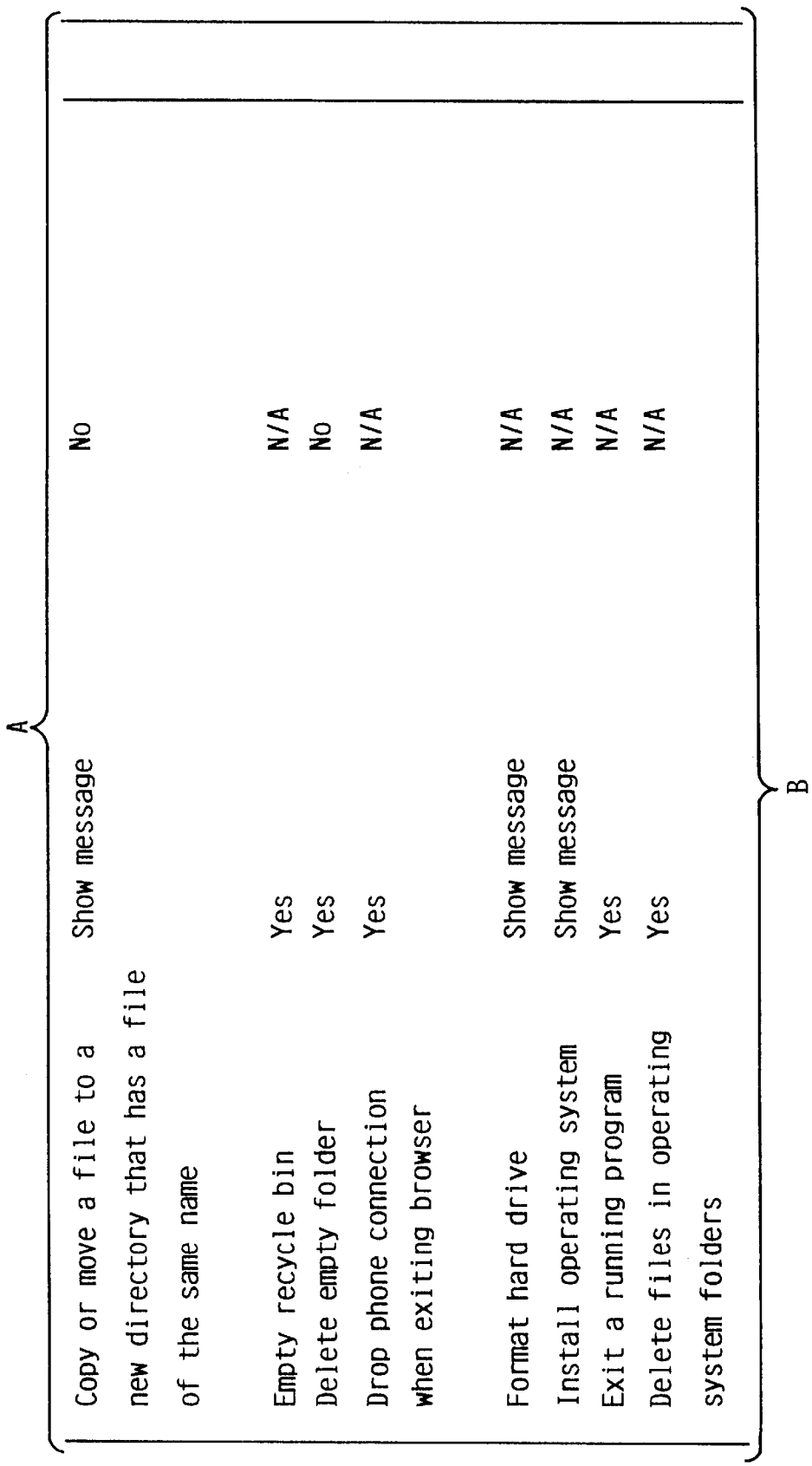
Figure 5C:
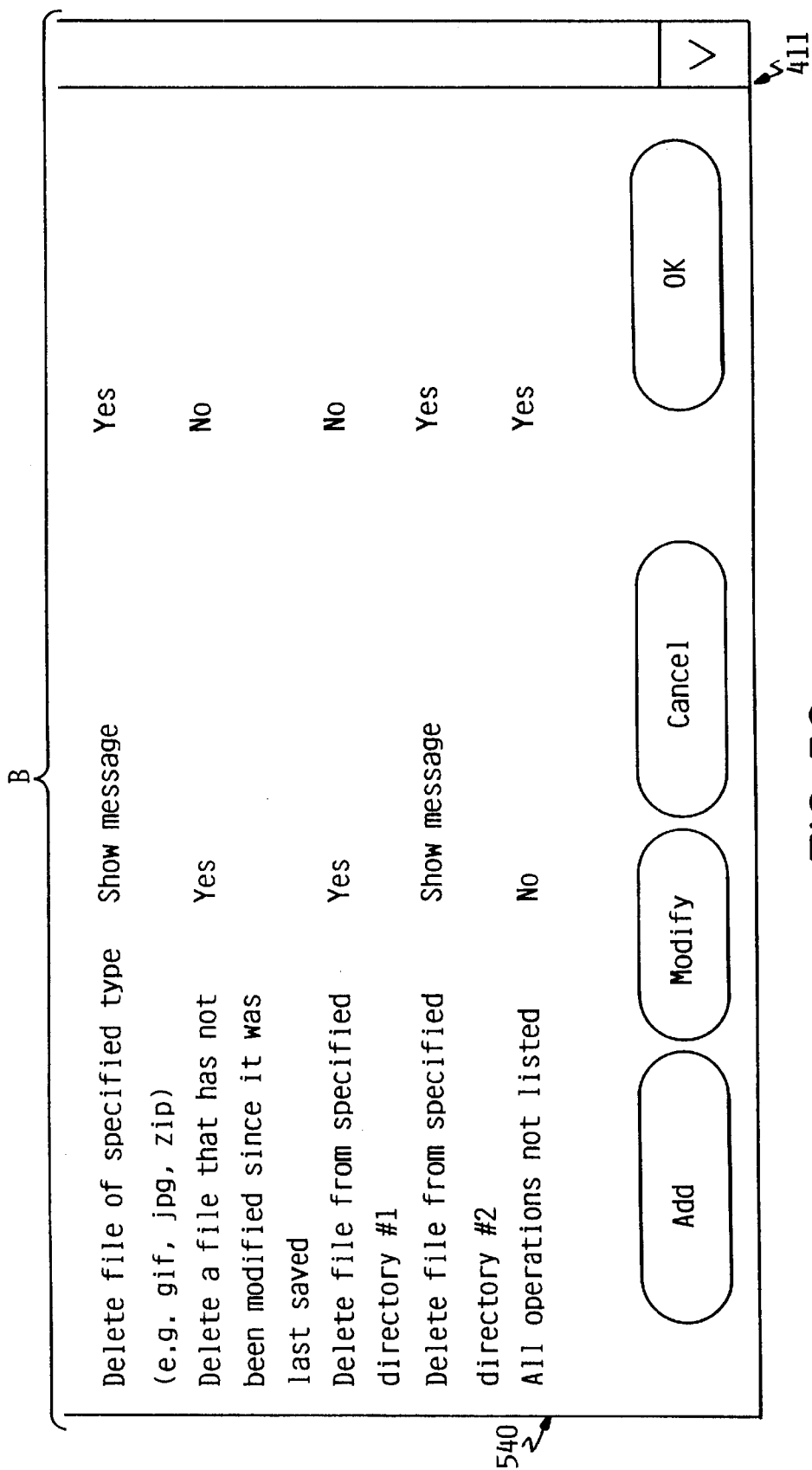

Referring to FIG. 5, there is displayed auto-configuration messages window 411, which is a dialog that allows the user to add and update entries in category-response list 393. Auto-confirmation messages 411 contains three columns: user-requested operation 510, confirmation response 520, and send-to-recycle bin 530. User-requested operation 510 contains a list of operations, which are destructive. The user may add, modify, and remove entries from this list. Confirmation response 520 allows the user to specify whether control program 399 is to produce an automatic response and what that automatic response should be. When column 520 contains "yes", control program 399 automatically responds "yes" to the confirmation message in column 510. When column 520 contains "no", control program 399 automatically responds "no" to the confirmation message in column 510. When column 520 contains "show message", control program 399 displays the confirmation message in column 510 to the user, so that the user can manually select the desired response. Send-to recycle bin 530 gives the user an opportunity to specify whether control program 399 should send the deleted data to the recycle bin. If column 530 contains "no", control program 399 does not send the deleted data to the recycle bin. If column 530 contains "yes", control program 399 sends the deleted data to the recycle bin. If column 530 contains "N/A", the recycle bin is not applicable to the corresponding operation in column 510. All operations not listed 540 is a default operation entry that directs control program 399 to use the default responses contained in columns 520 and 530 for all operations that the user has not specifically listed. The contents of columns 510, 520, and 530 contain example entries that a typical user might choose, but the user is free to choose other operations in column 510 and other actions in column 520 and 530.

Figure 6:
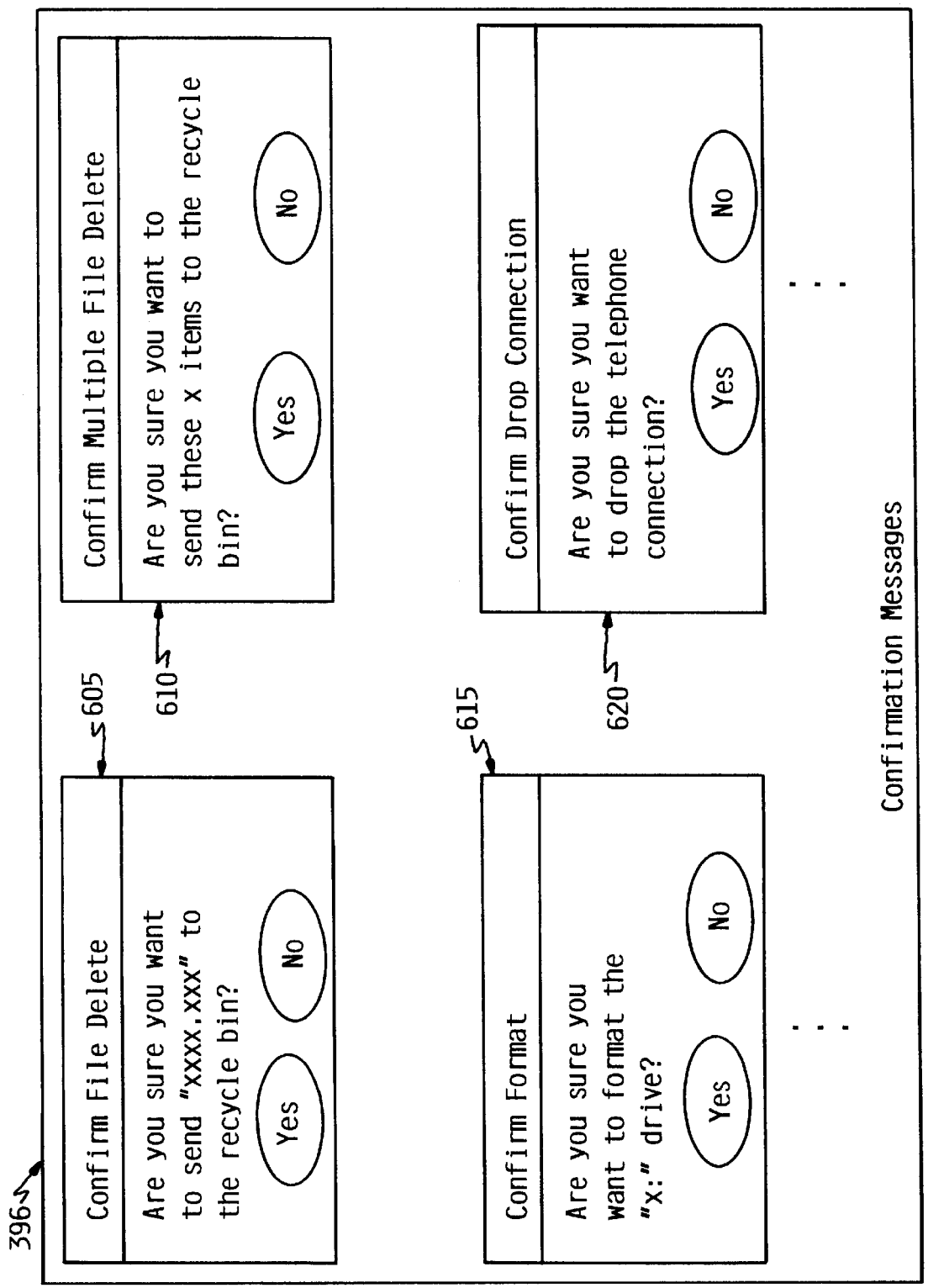
FIG. 6 is a block diagram of a primary data structure of the preferred embodiment.

Referring to FIG. 6, there is illustrated a block diagram of confirmation messages 396, which is a list of example, confirmation messages that operating system 390 might send to the user in response to the user requesting a destructive operation. In this example, confirmation messages 396 contains confirm file-delete message 605, confirm multiple-file delete message 610, confirm-format message 615, and confirm drop-connection message 620. For the purposes of illustration, the messages are shown in FIG. 6 as they would appear on display screen 114, although in actuality the messages are stored in confirmation messages 396 as data and pointers.

Figure 7:
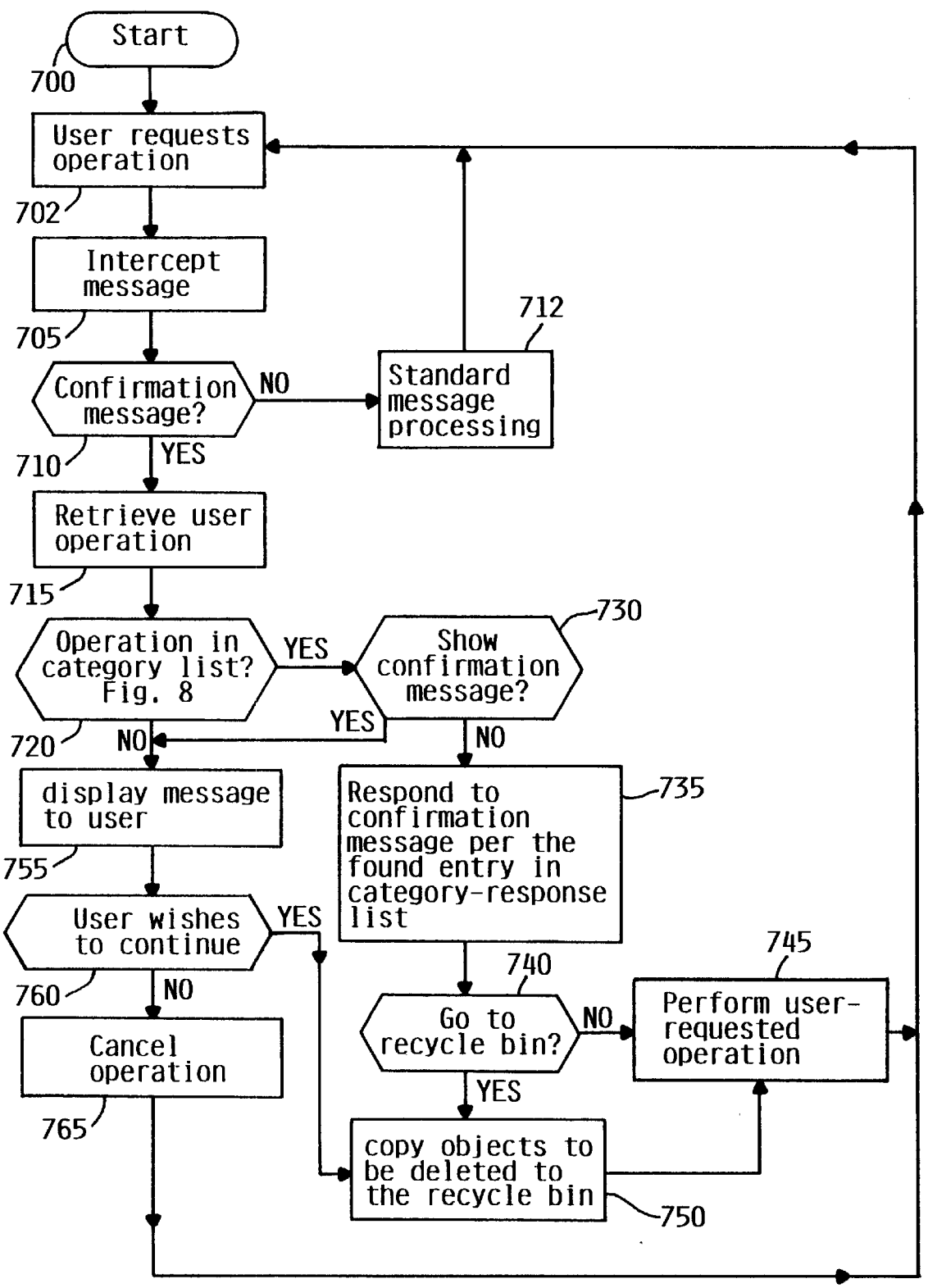
FIGS. 7 and 8 are flowcharts that describe the operation of the preferred embodiment.

FIG. 7 illustrates a flowchart that describes the operation of the preferred embodiment. Referring to FIG. 7, there is illustrated the main logic of control program 399 that detects and processes confirmation messages. At block 700, control program 399 starts. Control then continues to block 702 where the user requests an operation using desktop 400. Control then continues to block 705 where control program 399 intercepts a message that operating system 390 is sending to the user in response to the user-requested operation. Although in the preferred embodiment, this message would be displayed on display screen 114, in alternative embodiments, the message could be audio or tactile. Control then continues to block 710 where control program 399 determines whether the message intercepted at block 705 is one of the messages listed in confirmation messages 396. Control program 399 makes this determination by matching keywords in the text of the received message to keywords in the messages in confirmation messages 396. In an alternative embodiment, the confirmation messages have associated, unique identifiers.

If the determination at block 710 is false, then control continues to block 712 where control program 399 performs standard, message processing. Control then returns to block 702, as previously described above.

If the determination at block 710 is true, then control continues to block 715 where control program 399 retrieves the operation that the user requested at block 702 from user operation 394. Control then continues to block 720 where control program 399 determines whether the user-requested operation is in category-response list 393, as represented by the contents of column 510 and further described below under the description for FIG. 8.

Referring again to FIG. 7, if the determination at block 720 is true, then control continues to block 730 where control program 399 determines whether the user wishes to see the confirmation message, an indication of which is found in column 520. If the determination at block 730 is false, then control continues to block 735 where control program 399 responds to the confirmation message as specified by the contents of column 520 for the appropriate entry in column 510 in category-response list 393. Control program 399 does not display the confirmation message to the user. Control then continues to block 740 where control program 399 determines whether the user wishes that the deleted objects be sent to recycle bin 415 by checking the contents of column 530 in category-response list 393. If the determination at block 740 is false, then control continues to block 745 where control program 399 performs the user-requested operation without sending the object to the recycle bin. Control then returns to block 702 as previously described above.

If the determination at block 740 is true, then control program 399 copies the objects to be deleted to recycle bin 425 prior to performing the user-requested operation at block 745. Control then returns to block 702, as previously described above.

If the determination at block 730 is true, then the user wishes to see the confirmation message so control continues to block 755 where control program 399 displays the confirmation message to the user. Control then continues to block 760 where control program 399 determines whether the user wishes to continue with the requested operation. If the determination at block 760 is true, then control continues to block 750, as previously described above.

If the determination at block 760 is false, then control continues to block 765 where control program 399 cancels the user-requested operation. Control then returns to block 702, as previously described above.

If the determination at block 720 is false, then control continues to block 755, as previously described above.

Figure 8:
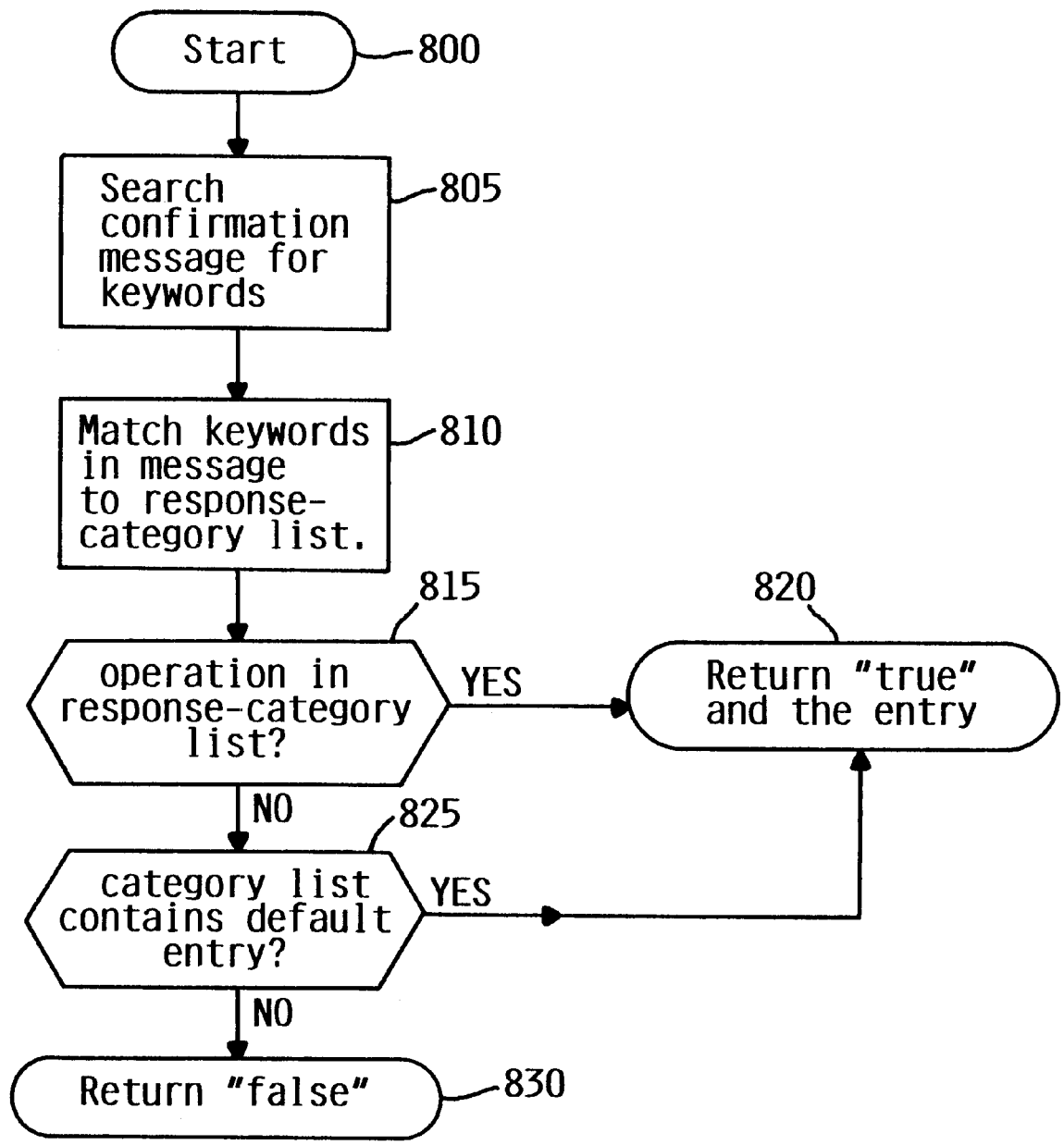

Referring to FIG. 8, there is illustrated a flowchart for determining whether the user-requested operation is contained in column 510 of category-response list 393. At block 800, the function begins. Control then continues to block 805 where control program 399 searches the confirmation message for keywords. Control program 399 determines the keywords to be searched by interrogating confirmation messages 396. In the example shown in FIG. 5, keywords could be, for example, such destructive words as "delete", "remove", and "format". Keywords are also categories of operations such as particular file types, such as "ico" for icon, "exe" for executable file, and "img", "jpg ", and "gif" for displayable files. Keywords could also be a specific folder name or file name. Control then continues to block 810 where control program 399 matches the found keywords in confirmation messages 396 to the keywords in category-response list 393. Control then continues to block 815 where control program 399 determines whether category-response list contains an entry for the user-requested operation based on the found keywords. If the determination at block 815 is true, then control then continues to block 820 where the function returns a value of "true" and the matched entry in category-response list 393.

If the determination at block 815 is false, then control continues to block 825 where control program 399 determines whether category-response list 393 contains an entry for operations otherwise not listed, which is shown as reference numeral 540 in FIG. 5. Referring again to FIG. 8, if the determination at block 825 is true, then control continues to block 820 as previously described above. If the determination at block 825 is false, then control continues to block 830 where the function returns a value of false.

Figure 9A:
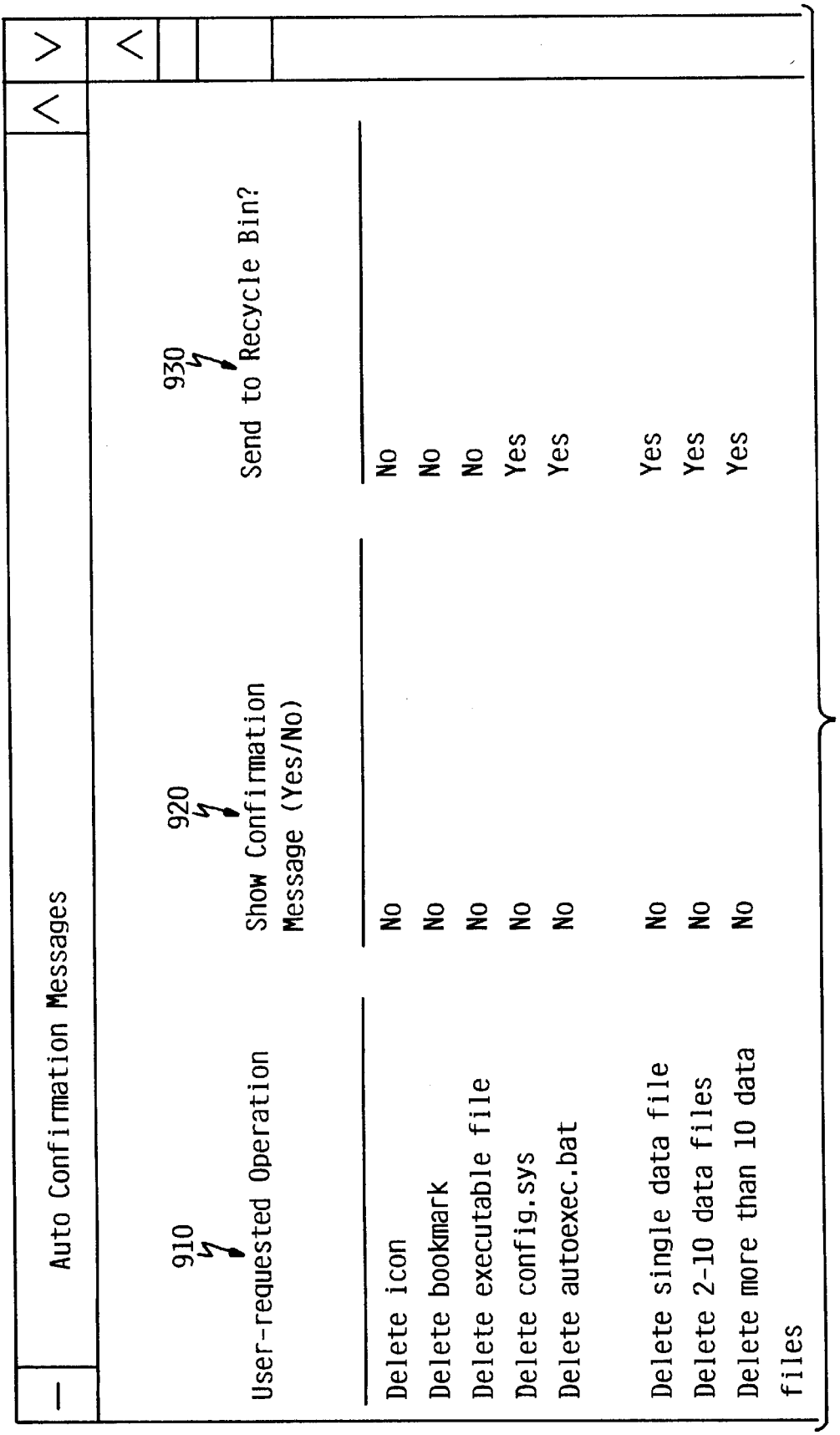
FIG. 9 is a pictorial representation of the interfaces that a user may operate to control the operation of an alternative embodiment.
Figure 9B:
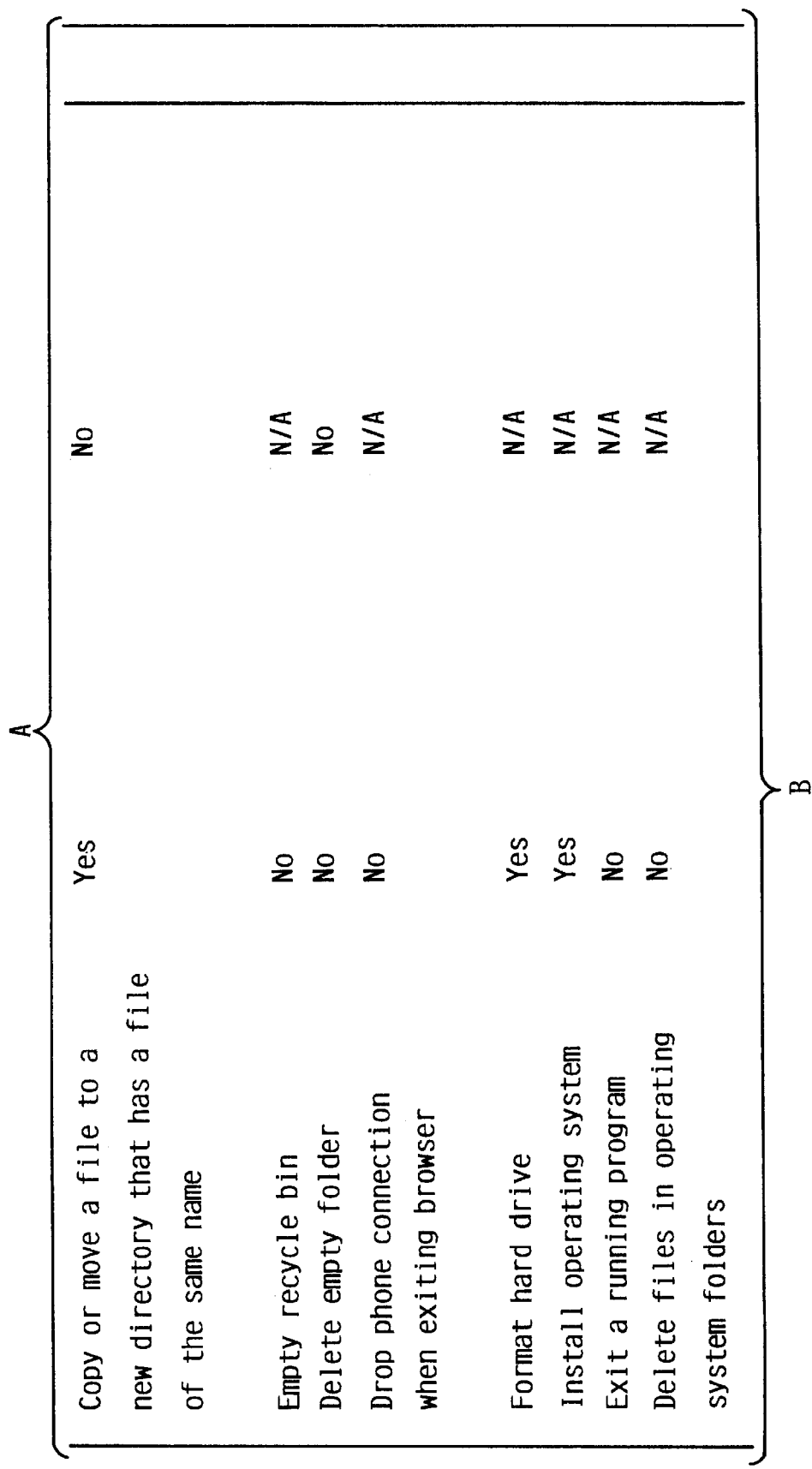
Figure 9C:
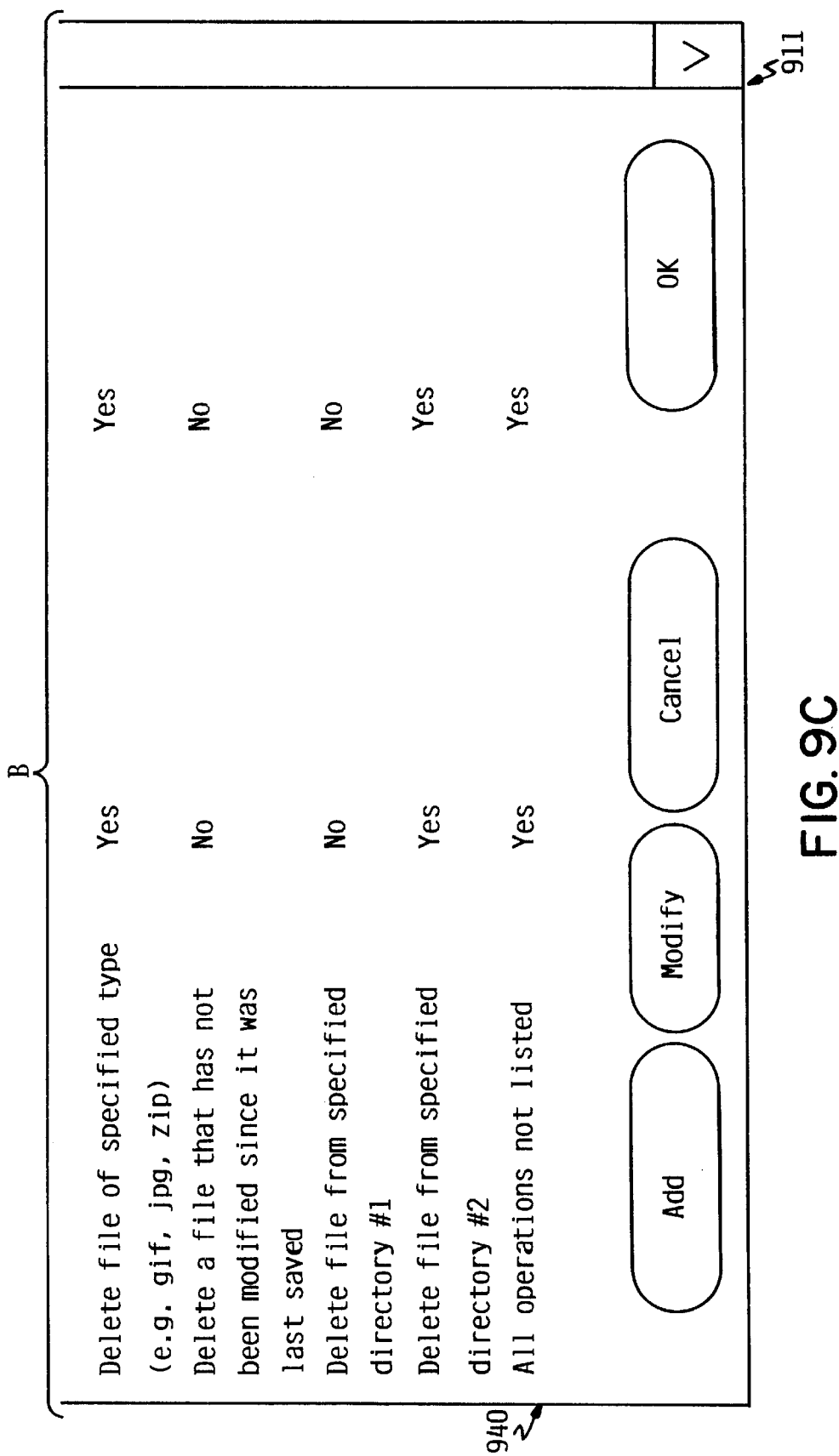
Figure 10:
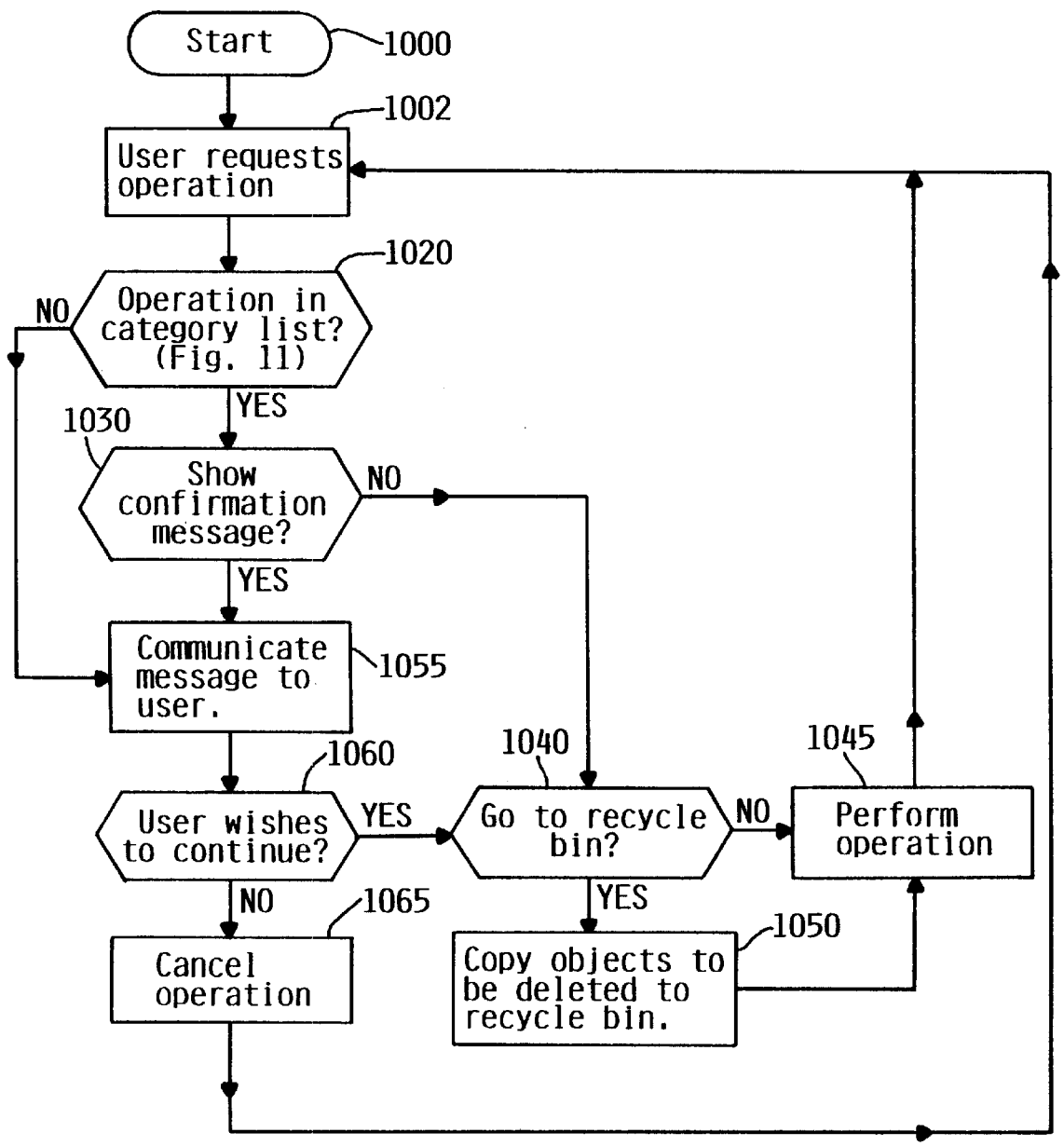
FIGS. 10 and 11 are flowcharts that describe the operation of an alternative embodiment.
Figure 11:
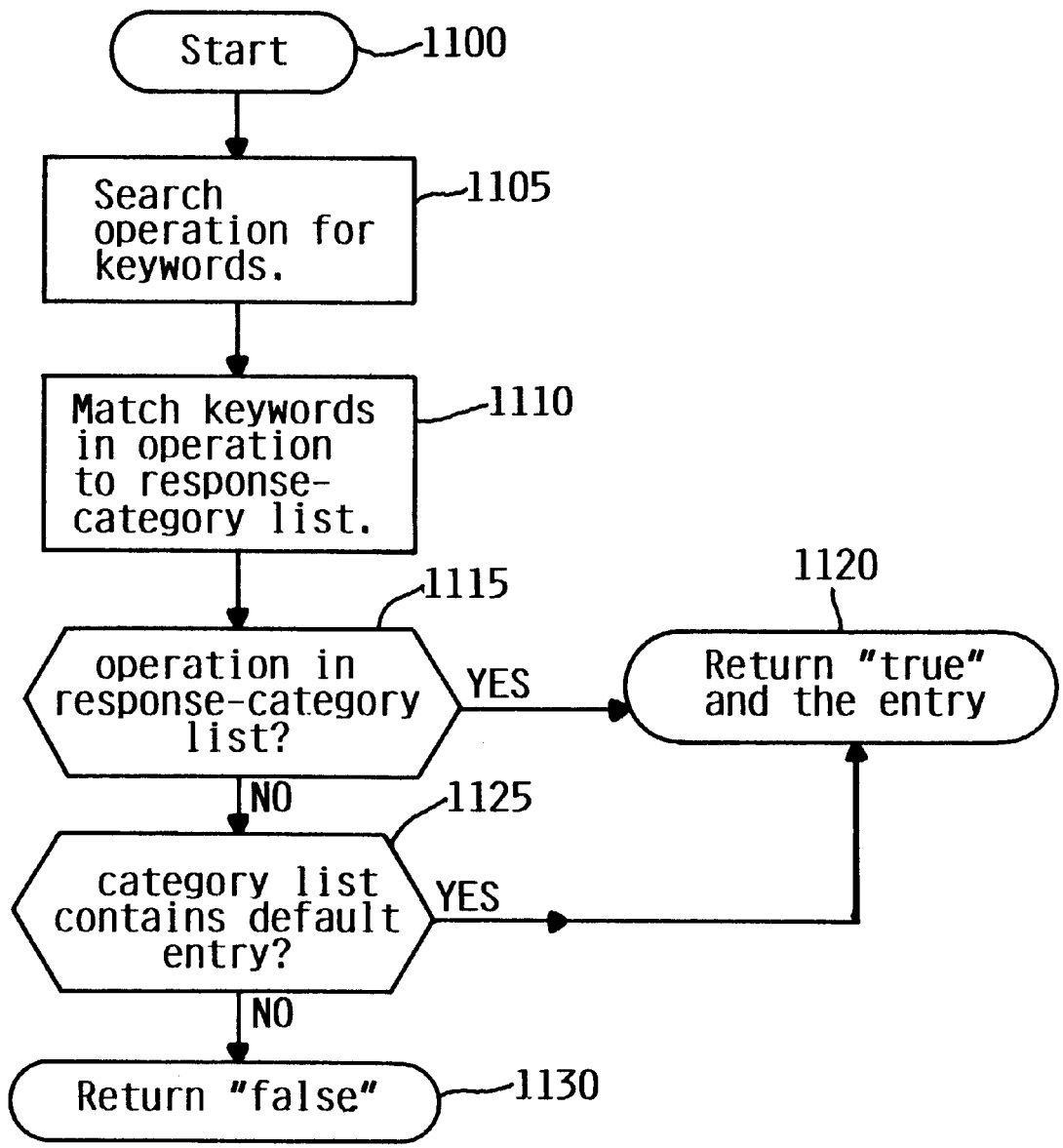

Referring to FIGS. 9, 10, and 11, there is described an alternative embodiment in which control program 399 is coupled with operating system 390, so that operating system 390 only generates confirmation messages when the user desires them.

Referring to FIG. 9, there is displayed auto-configuration messages window 911, which is a dialog that allows the user to add and update entries in category-response list 393, in an alternative embodiment. Auto-confirmation messages 911 contains three columns: user-requested operation 910, show confirmation message 920, and send-to-recycle bin 930. User-requested operation 910 contains a list of operations, which are destructive. The user may add, modify, and remove entries from this list. Show confirmation message 920 allows the user to specify whether control program 399 is to produce a confirmation message. When column 920 contains "yes", control program 399 communicates a confirmation message to the user. When column 920 contains "no", control program 399 refrains from communicating a confirmation messages to the user. Send-to recycle bin 930 gives the user an opportunity to specify whether control program 399 should send the deleted data to the recycle bin. If column 930 contains "no", control program 399 does not send the deleted data to the recycle bin. If column 930 contains "yes", control program 399 sends the deleted data to the recycle bin. If column 930 contains "N/A", the recycle bin is not applicable to the corresponding operation in column 910. All operations not listed 940 is a default operation entry that directs control program 399 to use the default responses contained in columns 920 and 930 for all operations that the user has not specifically listed. The contents of columns 910, 920, and 930 contain example entries that a typical user might choose, but the user is free to choose other operations in column 910 and other actions in column 920 and 930.

FIG. 10 illustrates a flowchart that describes the operation of the alternative embodiment. Referring to FIG. 10, there is illustrated the main logic of control program 399 that responds to requests from the user. At block 1000, control program 399 starts. Control then continues to block 1002 where the user requests an operation using desktop 400. Control then continues to block 1020 where control program 399 determines whether the user-requested operation is in category-response list 393, as represented by the contents of column 910 and further described below under the description for FIG. 11.

Referring again to FIG. 10, if the determination at block 1120 is true, then control continues to block 1130 where control program 399 determines whether the user wishes to see the confirmation message, an indication of which is found in column 920. If the determination at block 1030 is false, then control continues to block 1040 where control program 399 determines whether the user wishes that the deleted objects be sent to recycle bin 415 by checking the contents of column 930 in category-response list 393. If the determination at block 1040 is false, then control continues to block 1045 where control program 399 performs the user-requested operation without sending the object to the recycle bin and without sending a confirmation message. Control then returns to block 1002 as previously described above.

If the determination at block 1040 is true, then control continues to block 1050 where control program 399 copies the objects to be deleted to recycle bin 425. Control then continues to block 1045, as previously described above.

If the determination at block 1030 is true, then control continues to block 1055 where control program 399 displays the confirmation message to the user. Control then continues to block 1060 where control program 399 determines whether the user wishes to continue with the requested operation. If the determination at block 1060 is true, then control continues to block 1040, as previously described above.

If the determination at block 1060 is false, then control continues to block 1065 where control program 399 cancels the user-requested operation. Control then returns to block 1002, as previously described above.

If the determination at block 1020 is false, then control continues directly to block 1055, as previously described above.

Referring to FIG. 11, there is illustrated a flowchart for determining whether the user-requested operation is contained in column 910 of category-response list 393. At block 1100, the function begins. Control then continues to block 1105 where control program 399 searches the user-requested operation for the keywords in column 910. Control then continues to block 1110 where control program 399 matches the found keywords to column 910 in category-response list 393. Control then continues to block 1115 where control program 399 determines whether category-response list 393 contains an entry for the user-requested operation based on the found keywords. If the determination at block 1115 is true, then control then continues to block 1120 where the function returns a value of "true" and the matched entry in category-response list 393.

If the determination at block 1115 is false, then control continues to block 1125 where control program 399 determines whether category-response list 393 contains an entry for operations otherwise not listed, which is shown as reference numeral 940 in FIG. 9. Referring again to FIG. 11, if the determination at block 1125 is true, then control continues to block 1120 as previously described above. If the determination at block 1125 is false, then control continues to block 1130 where the function returns a value of false.

While this invention has been described with respect to the preferred and alternative embodiments, it will be understood by those skilled in the art that various changes in detail may be made therein without derailing from the spirit, scope, and teaching of the invention. For example, computer operating-systems may become widely employed in consumer applications such as operator panels for consumer electronics, appliances, and automobiles. Accordingly, the herein disclosed invention is to be limited only as specified in the following claims.

What is claimed is:

1. A method for providing configurable categories of confirmation messages, comprising:

maintaining a user-modifiable confirmation message configuration record, said confirmation message configuration record specifying, with respect to a plurality of operations, whether a corresponding configuration message is to be communicated to the user;

intercepting a confirmation message;

deciding whether the confirmation message is to be communicated to the user based on information in said user-modifiable confirmation message configuration record; and selectively communicating the confirmation message to the user based on the results of said step of deciding whether the confirmation message is to be communicated.

2. The method of claim 1, further comprising:

when the confirmation message is not to be communicated to the user, automatically responding to the confirmation message with a response specified by said confirmation message configuration record.

3. The method of claim 1, wherein the confirmation message configuration record comprises a list of operations and a list of responses to the operations.

4. The method of claim 3, further comprising:

allowing a user to modify the list of operations.

5. The method of claim 3, further comprising:

allowing a user to modify the list of responses.

6. The method of claim 3, wherein the confirmation message configuration record further comprises a list of recycle bin options.

7. The method of claim 6, further comprising:

determining whether deleted data associated with the operation is to be sent to a recycle bin based on the recycle bin options;

when the recycle bin options indicates that the deleted data is to be sent to the recycle bin, sending the deleted data to the recycle bin; and when the recycle bin options indicates that the deleted data is not to be sent to the recycle bin, refraining from sending the deleted data to the recycle bin.

8. The method of claim 1, wherein the deciding step further comprises:

searching the confirmation message for keywords.

9. The method of claim 1, further comprising:

maintaining a default operation specification in said confirmation message configuration record, said default operation specification specifying a default response to be taken if the operation is not otherwise specified in said confirmation message configuration record;

when the operation is not otherwise specified in said confirmation message configuration record, responding to the confirmation message based on the default response associated with the default operation.

10. A computer system that provides configurable categories of confirmation messages, comprising:

a processor;

memory coupled to the processor;

a user-modifiable confirmation message configuration record storable in said memory, said confirmation message configuration record specifying, with respect to a plurality of operations, whether a corresponding configuration message is to be communicated to the user; and a control program residing in the memory and executing on the processor, wherein the control program intercepts a confirmation message, decides whether the confirmation message is to be communicated to the user based on information in said user-modifiable confirmation message configuration record, and selectively communicates the confirmation message to the user based on the results of deciding whether the confirmation message is to be communicated.

11. The computer system of claim 10, wherein the control program further:

when the confirmation message is not to be communicated to the user, automatically responds to the confirmation message with a response specified by said confirmation message configuration record.

12. The computer system of claim 10, wherein the confirmation message configuration record comprises a list of operations and a list of responses to the operations.

13. The computer system of claim 12, wherein the control program further:

allows a user to modify the list of operations.

14. The computer system of claim 12, wherein the control program further:

allows a user to modify the list of responses.

15. The computer system of claim 12, wherein the confirmation message configuration record further comprises a list of recycle bin options.

16. The computer system of claim 15, wherein the control program further:

determines whether deleted data associated with the operation is to be sent to a recycle bin based on the recycle bin options, when the recycle bin options indicates that the deleted data is to be sent to the recycle bin, sends the deleted data to the recycle bin, and when the recycle bin options indicates that the deleted data is not to be sent to the recycle bin, refrains from sending the deleted data to the recycle bin.

17. The computer system of claim 10, wherein the control program further:

searches the confirmation message for keywords.

18. The computer system of claim 10, wherein the control program further:

maintains a default operation specification in said confirmation message configuration record, said default operation specification specifying a default response to be taken if the operation is not otherwise specified in said confirmation message configuration record, and when the operation is not otherwise specified in said confirmation message configuration record, responds to the confirmation message based on the default response associated with the default operation.

19. A program product that provides configurable categories of confirmation messages, comprising:

a control program that:
  (a) intercepts a confirmation message,
  (b) decides whether the confirmation message is to be communicated to the user based on information in a user-modifiable confirmation message configuration record, said confirmation message configuration record specifying, with respect to a plurality of operations, whether a corresponding configuration message is to be communicated to the user, and
  (c) selectively communicates the confirmation message to the user based on the results of deciding whether the confirmation message is to be communicated; and signal-bearing media bearing the control program.

20. The program product of claim 19, wherein the control program further:

when the confirmation message is not to be communicated to the user, automatically responds to the confirmation message with a response specified by said confirmation message configuration record.

21. The program product of claim 19, wherein the confirmation message configuration record comprises a list of operations and a list of responses to the operations.

22. The program product of claim 21, wherein the control program further:

allows a user to modify the list of operations.

23. The program product of claim 21, wherein the control program further:

allows a user to modify the list of responses.

24. The program product of claim 21, wherein the confirmation message configuration record further comprises a list of recycle bin options.

25. The program product of claim 24, wherein the control program further:

determines whether deleted data associated with the operation is to be sent to a recycle bin based on the recycle bin options, when the recycle bin options indicates that the deleted data is to be sent to the recycle bin, sends the deleted data to the recycle bin, and when the recycle bin options indicates that the deleted data is not to be sent to the recycle bin, refrains from sending the deleted data to the recycle bin.

26. The program product of claim 19, wherein the control program further:

searches the confirmation message for keywords.

27. The program product of claim 19, wherein the control program further:

maintains a default operation specification in said confirmation message configuration record, said default operation specification specifying a default response to be taken if the operation is not otherwise specified in said confirmation message configuration record, and when the operation is not otherwise specified in said confirmation message configuration record, responds to the confirmation message based on the default response associated with the default operation.

28. A program product that provides configurable categories of confirmation messages, comprising:

a control program that determines whether an user-requested operation is in a user-modifiable category list of destructive operations, said user-modifiable category list comprising a plurality of destructive operations and corresponding responses, and when the operation is in the category list, finds a response in the category list, and decides whether a confirmation message is to be communicated to the user based on the response; and signal-bearing media bearing the control program.

29. The program product of claim 28, wherein the control program further:

when the confirmation message is to be communicated to the user, communicates the confirmation message to the user.

30. The program product of claim 28, wherein the control program further:

when the confirmation message is not to be communicated to the user, the control program completes the user-requested operation.

31. The program product of claim 28, wherein the category list comprises a list of operations and a list of responses, wherein the responses indicate whether a confirmation is to be communicated to the user.

32. The program product of claim 31, wherein the control program further:

allows a user to modify the list of operations.

33. The program product of claim 31, wherein the control program further:

allows a user to modify the list of responses.

34. The program product of claim 31, wherein the category list further comprises a list of recycle bin options.

35. The program product of claim 34, wherein the control program further:

determines whether deleted data associated with the operation is to be sent to a recycle bin based on the recycle bin options, when the recycle bin options indicates that the deleted data is to be sent to the recycle bin, sends the deleted data to the recycle bin, and when the recycle bin options indicates that the deleted data is not to be sent to the recycle bin, refrains from sending the deleted data to the recycle bin.

36. The program product of claim 28, wherein the control program further:

searches the user-requested operation for keywords.

37. The program product of claim 28, wherein the control program further:

when the operation is not in the category list, searches the category list for a default operation, and when the category list contains a default operation, determines whether to communicate the confirmation message to the user based on a default response associated with the default operation.

* * * * *